Patented Nov. 30, 1948

2,454,779

UNITED STATES PATENT OFFICE 2,454,779

METHOD FOR THE PREPARATION OF METHALLYLBENZENE AND RELATED COMPOUNDS

David Davidson, New York, N. Y., and Samuel J. Kahn, Rutherford, N. J., assignors to The Trubek Laboratories, Incorporated, East Rutherford, N. J., a corporation of New Jersey No Drawing. Application July 26, 1947, Serial No. 764,008

13 Claims. (Cl. 260—668)

This invention relates to a method for the preparation of methallylbenzene and certain para-alkyl methallylbenzenes.

It is known in the art to prepare methallylbenzene. Thus, Whitmore et al. have disclosed a method for the production of that compound by the simple pyrolysis of neophyl chloride (1-chloro-2-methyl-2-phenylpropane). J. Am. Chem. Soc. 65, 1470 (1943). Their method is not a completely satisfactory one, however, since it results in the production of a pyrolysis product which contains a higher proportion of isobutenylbenzene (beta, beta-dimethylstyrene) than methallylbenzene (2 - methyl - 3 - phenyl - 1 - propene), whereas the latter compound is much more useful than the former in the preparation of perfume ingredients, in accordance with the disclosures of our applications referred to hereinafter.

It is therefore the primary object of this invention to provide a method for the preparation of methallylbenzene and certain para-alkyl methallylbenzenes in greatly increased yield.

Other objects of this invention will appear hereinafter.

The foregoing and other objects are accomplished in accordance with the present invention by pyrolyzing certain neophyl halides or certain para-alkyl neophyl halides in admixture with at least a stoichiometric amount of an alkali metal salt of an acid having a pK value within the range 4–7 or in admixture with an alkaline earth metal salt of an acid having a pK value within the range 4–7.

The following examples, which are to be considered not limitative, illustrate more clearly the practice of this invention.

Example I 60 gms. of acetic acid was fractionated at atmospheric pressure from a mixture containing 300 gms. of acetamide, 123 gms. of sodium acetate, 90 gms. of glacial acetic acid, and 210.5 gms. of para-isopropyl neophyl chloride, while the mixture was stirred and the temperature thereof was maintained at 180–190° C. The temperature of the reaction mixture was then raised to 230° C. and there was recovered a distillate containing an upper oily layer and a lower acetamide-acetic acid layer. The upper oily layer was separated from the lower layer and was then washed with dilute aqueous sodium carbonate and water until it was neutral. The oily layer, which contained the theoretical weight of mixed olefins, contained 75% of para-methallylcumene and 25% of para-isobutenylcumene, and had an $n_D$ at 20° C. of 1.509. This mixture was then separated by means of a customary vacuum fractionation procedure into para-methallylcumene having a boiling point of 70° C. at 1 mm. of mercury pressure and an $n_D$ at 20° C. of 1.503 and para-isobutenylcumene having a boiling point of 85° C. at 1 mm. of mercury pressure and an $n_D$ at 20° C. of 1.527.

Example II 120 gms. of a 50% aqueous solution of sodium hydroxide was added slowly to 846 gms. of oleic acid with simultaneous distillation of water from the mixture. The mixture was then heated to 210° C. and 210.5 gms. of para-isopropyl neophyl chloride was added. After the addition of the para-isopropyl neophyl chloride had been completed, the mixture was stirred for a further period of four hours at 210° C. The mixture was then subjected to vacuum distillation to 210° C. in the flask and a pressure of 8 mm. of mercury to yield a mixture of hydrocarbons, which was then fractionated under a vacuum to yield 151 gms. of a mixture of olefins having an $n_D$ at 20° C. of 1.510 and containing 72% of para-methallylcumene and 28% of para-isobutenylcumene.

Example III

An equivalent amount of para-ethyl neophyl chloride was substituted for the para-isopropyl neophyl chloride used in Example I, and the remainder of the steps of the example were carried out as described therein. This procedure yielded 150 gms. of a mixture of olefins having an $n_D$ at 20° C. of 1.514 and consisting of 75% of para-methallyl-ethylbenzene and 25% of para-isobutenyl-ethylbenzene. These isomers were separated by fractionation under a vacuum as described in Example I, yielding para-methallyl-ethylbenzene having a boiling point of 85° C. at 10 mm. of mercury pressure and an $n_D$ at 20° C. of 1.508 and para-isobutenyl-ethylbenzene having a boiling point of 78° C. at 3 mm. of mercury pressure and an $n_D$ at 20° C. of 1.531.

Example IV

A mixture containing 300 gms. of ethylene glycol, 120 gms. of sodium formate and 210.5 gms. of para-isopropyl neophyl chloride was maintained at 188–190° C. for 2.5 hours while water was removed through a fractionating column. The material remaining in the reaction flask was then distilled rapidly until the temperature thereof reached 227° C. The distillate consisted of two layers, the upper of which after having been washed three times with 100 ml. portions of water weighed 155 gms., had an $n_D$ at 20° C. of 1.508, and consisted essentially of a mixture of para-methallylcumene (79%) and isobutenylcumene (21%).

*Example V*

An equivalent amount of para-tertiary-butyl neophyl chloride was substituted for the para-isopropyl neophyl chloride employed in Example I, and the remaining steps of that example were carried out as described therein. This procedure yielded 173 gms. of an olefin mixture which was separated by fractional distillation into para-tertiary-butyl methallylbenzene, which boiled at 65° C. at an absolute pressure of 2 mm. of mercury and had an $n_D$ at 20° C. of 1.502, and para-tertiary-butyl isobutenylbenzene, which had a boiling point of 75° C. at an absolute pressure of 2 mm. of mercury and an $n_D$ at 20° C. of 1.520. The ratio of methallyl compound to isobutenyl compound was substantially that obtained in Example I.

*Example VI*

A mixture of 300 gms. of acetamide, 123 gms. of sodium acetate, 90 gms. of acetic acid, and 168.5 gms. of neophyl chloride was slowly fractionated, while the temperature in the flask was maintained at 180-190° C. for four hours. The distillate I was then returned to the flask, together with 82 gms. of sodium acetate, and was thereafter fractionated again until the temperature in the flask reached 180° C. to produce distillate II. The residue was then rapidly distilled until the temperature in the reaction flask reached 210° C. to produce distillate III. Distillate III consisted of two layers, the lower of which was returned to the reaction flask and the upper of which was combined with distillate II, neutralized with 10% aqueous sodium hydroxide and steam distilled. The oily product obtained weighed 123 gms., had an $n_D$ at 20° C. of 1.516, and consisted of methallylbenzene (75%) and isobutenylbenzene (25%), which were then separated by fractional distillation.

*Example VII*

An equivalent amount of para-methyl neophyl chloride was substituted for the para-isopropyl neophyl chloride in Example II, and the remaining steps of that example were carried out as described therein. This procedure yielded a mxiture of para-methyl methallylbenzene, which had a boiling point of 78° C. at an absolute pressure of 12 mm. of mercury and an $n_D$ at 20° C. of 1.510, and para-methyl isobutenylbenzene, which had a boiling point of 88° C. at an absolute pressure of 12 mm. of mercury and an $n_D$ at 20° C. of 1.538, in the weight proportion of 70 to 30.

The foregoing examples are illustrative of the method of this invention for the preparation in high yield of methallylbenzene and certain para-alkyl methallylbenzenes by heating certain neophyl halides or certain para-alkyl neophyl halides in admixture with at least a stoichiometric amount of an alkali metal salt or an alkaline earth metal salt of an acid having a pK value within the range 4-7.

A wide variety of neophyl halides or para-alkyl neophyl halides may be pyrolyzed in accordance with this invention. Hence, in place of the para-isopropyl neophyl chloride, para-ethyl neophyl chloride, para-tertiary-butyl neophyl chloride, neophyl chloride, and para-methyl neophyl chloride employed in the examples, there may be substituted any other compound having the generic formula A—P—X, in which A is a hydrogen atom or an alkyl radical having from one to seven carbon atoms, P is the para-phenylene radical, and X is the chloro-tertiary-butyl, bromo-tertiary-butyl or iodo-tertiary-butyl radical. Thus, among the many compounds which may be substituted equivalently for the specific compounds employed in the examples are neophyl bromide, neophyl iodide, para-ethyl neophyl bromide, para-ethyl neophyl iodide, para-tertiary-amyl neophyl chloride, para-tertiary-amyl neophyl bromide, para-tertiary-amyl neophyl iodide, para-n-hexyl neophyl chloride, etc.

In order for the pyrolysis method of the present invention to be effective in producing the high yield of the methallyl derivative, it is necessary that the neophyl halide or the para-alkyl neophyl halide be heated when in admixture with at least a stoichiometric amount of an alkali metal salt or an alkaline earth metal salt of an acid having a pK value within the range 4-7. Such salts may suitably be the lithium, sodium, potassium, magnesium, calcium, strontium and barium salts of the aliphatic organic acids (e. g., formic, acetic, propionic, n-butyric, i-butyric, fumaric, succinic, oleic, adipic, lauric, stearic, etc. acids), of the aromatic acids (e. g., benzoic, phenylacetic, o-methylbenzoic, gamma-phenyl-butyric, phthalic, etc. acids), of naphthenic acid, etc. Mixtures of the aforementioned salts may also suitably be employed in admixture with the neophyl halide or the para-alkyl neophyl halide, the essential requirement for practicing the present invention being that the sum of the moles of the alkali metal salts plus one-half the sum of the moles of the alkaline earth metal salts used at lease be equal to the moles of neophyl halide or para-alkyl neophyl halide employed. It is preferred to use as a reagent the sodium salts of the straight-chain, saturated, aliphatic monocarboxylic acids having from one to eighteen carbon atoms.

The pyrolysis procedure of this invention may be effected simply by heating at an elevated temperature a mixture consisting essentially of the alkali metal or alkaline earth metal salt and the neophyl halide or the para-alkyl neophyl halide. Preferably, however, in order to promote the contacting of the neophyl halide or the para-alkyl neophyl halide and the salt, the reaction mixture should contain a solvent having one or more hydrophylic groups which tend to effect a solution of the salt. Among such suitable solvents are the organic amides (e. g., acetamide, propionamide, n-butyramide, n-valeramide, n-capronamide, benzamide, succinimide, etc.), alcohols, (e. g., ethylene glycol, propylene glycol, trimethylene glycol, glycerol), and organic acids (e. g., acetic, propionic, lauric, stearic, oleic, benzoic, etc. acids). Thus, the solvent may suitably be an excess of the acid used in preparing the salt, for example, acetic acid, propionic acid, etc. Furthermore, compatible mixtures of any of the aforementioned solvents may also be suitably employed in promoting the contacting of the salt and the neophyl halide or the para-alkyl neophyl halide.

The dehydrohalogenation of the neophyl halide or the para-alkyl neophyl halide may be effected in accordance with this invention by heating the reaction mixture over a wide range of temperatures. In general, however, a reaction temperature of from about 175 to about 235° C. has been found most suitable. After the pyrolysis has been accomplished by heating the reaction mixture for the required period of time, the desired methallyl derivative may be recovered by procedures which are conventional, viz., distillation and fractionation.

The methallylbenzene and para-alkyl methallyl-benzenes produced in accordance with the present invention are useful chemical compounds. Thus, they may be oxidized to their corresponding glycols in accordance with the method described in our copending application, Serial No. 764,009, filed of even date herewith, now abandoned and entitled "Method for the preparation of methallylbenzene glycol and related compounds and the compounds produced," and the glycols thus prepared may be dehydrated to the corresponding aldehydes to form compounds which are useful perfume ingredients, in accordance with the method described in our copending application, Serial No. 764,010, filed of even date herewith, and entitled "Method for the preparation of alpha-methyl hydrocinnamic aldehyde and related compounds."

Many of the halides employed as a reactant in accordance with the present invention are novel chemical compounds, and the remainder of this specification will therefore be devoted to a detailed disclosure concerning their method of preparation and also the properties of some of them.

Thus, in order to prepare para-isopropyl neophyl chloride, the following procedure was employed: To a vigorously stirred mixture containing 3000 gms. of isopropylbenzene and 276 gms. of concentrated sulfuric acid (94% $H_2SO_4$ by weight) were added over a period of three hours 543 gms. of methallyl chloride, while the temperature of the reaction mixture was maintained at 5–10° C. after the addition of the methallyl chloride had been completed, the reaction mixture stirred for a further period of two hours, during which time the temperature thereof was permitted to rise slowly to room temperature. After the stirring had been stopped, the reaction mixture separated into two layers, an oily upper layer and a lower acid layer. The oily layer was separated from the acid layer, and the oil was then washed with dilute aqueous sodium carbonate and finally with water until it was neutral. Thereafter, the excess isopropylbenzene was removed from the oily layer by distillation at a pressure of 50 mm. of mercury, and the remainder of the oily layer was fractionated at an absolute pressure of 7 mm. of mercury. This procedure yielded 1030 gms. of para-isopropyl neophyl chloride (81.5% of the theoretical, based upon the methallyl chloride employed) having an $n_D$ at 20° C. of 1.517 and a boiling point of 125–126° C. at a pressure of 7 mm. of mercury.

In addition, using the procedure described in the preceding paragraphs, by substituting an equivalent amount of ethylbenzene for the isopropylbenzene employed therein, there was obtained in comparable yield para-ethyl neophyl chloride having an $n_D$ at 20° C. of 1.521 and a boiling point of 116° C. at an absolute pressure of 7 mm. of mercury. Furthermore, using the procedure described in the preceding paragraph and by substituting an equivalent amount of tertiary-butylbenzene for the isopropylbenzene used therein, there was obtained in comparable yield para-tertiary-butyl neophyl chloride having a boiling point of 112° C. at an absolute pressure of 2 mm. of mercury and a solidification point of 35° C.

Other strong acids may be substituted for the concentrated sulfuric acid employed in preparing the para-isopropyl neophyl chloride, among such acids being fluosulfonic acid, chlorosulfonic acid, phosphoric acid, hydrofluoric acid, nitric acid, boron fluoride, benzene sulfonic acid, the toluene sulfonic acids, the naphthalene sulfonic acids, etc. Furthermore, in place of the methallyl chloride used, there may be equivalently substituted methallyl bromide, or methallyl iodide, and for the isopropylbenzene, ethyl benzene and tertiary-butyl benzene there may be equivalently employed benzene, toluene, n-propylbenzene, n-butylbenzene, tertiary-amylbenzene, n-hexylbenzene and other monoalkyl benzenes having from one to seven carbon atoms in the alkyl radical. The reaction is preferably conducted using a substantial stoichiometric excess of the benzene or monoalkyl benzene, in comparison with the amount of the methallyl halide employed, in order to minimize the possibility of reaction of one mole of the benzene or monoalkyl benzene with two moles of the methallyl halide. Hence, the reaction mixture should preferably contain at least two moles of benzene or monoalkyl benzene per mole of methallyl halide. The use of a large excess of benzene or monoalkyl benzene gives rise to little disadvantage, since the excess may be easily removed and recovered from the reaction mixture with little loss. The condensation process between the neophyl halide and the benzene or monoalkyl benzene is conducted simply by contacting the reactants and acid catalyst with vigorous stirring until the reaction is substantially complete. In general, temperatures below about 50° C. are employed in conducting the condensation, and it is preferred to use a reaction temperature from about minus 10 to about plus 50° C. After the completion of the reaction, the neophyl halide or para-alkyl neophyl halide may be separated in good yield and high purity from the reaction mixture by the separation of the oily layer and fractionation thereof.

We claim:

1. The method for the preparation of methallylbenzene and certain para-alkyl methallyl-benzenes which comprises heating at pyrolysis temperatures in admixture with at least a stoichiometric amount of a material selected from the group consisting of alkali metal salts of acids having a pK value within the range 4–7 and alkaline earth metal salts of acids having a pK value within the range 4–7 a compound having the generic formula A—P—X, in which A is a substituent selected from the group consisting of hydrogen and alkyl radicals having from one to seven carbon atoms, P is the para-phenylene radical, and X is a substituent selected from the group consisting of the chloro-tertiary-butyl, bromo-tertiary-butyl and iodo-tertiary-butyl radicals.

2. The method of claim 1 in which X is the chloro-tertiary-butyl radical.

3. The method of claim 1 in which the heating is effected at a temperature within the range from about 175 to about 235° C.

4. The method for the preparation of methallylbenzene and certain para-alkyl methallyl-benzenes which comprises heating at pyrolysis temperatures in admixture with at least a stoichiometric amount of a material selected from the group consisting of alkali metal salts of acids having a pK value within the range 4–7 and alkaline earth metals salts of acids having a pK value within the range 4–7 a compound having the generic formula A—P—X, in which is a substituent selected from the group consisting of hydrogen and alkyl radicals having from one to seven carbon atoms, P is the para-phenylene radical, and X is a substituent selected from the group consisting of the chloro-tertiary-butyl, bromo-tertiary-butyl and iodo-tertiary-butyl radicals, the pyrolysis being effected with the reaction mixture containing a solvent having at least one hydrophylic group.

5. The method for the preparation of methallylbenzene and certain para-alkyl methallylbenzenes which comprises heating at pyrolysis temperatures in admixture with at least a stoichiometric amount of sodium acetate a compound having the generic formula A—P—X, in which A is a substituent selected from the group consisting of hydrogen and alkyl radicals having from one to seven carbon atoms, P is the paraphenylene radical and X is the chloro-tertiary-butyl radical.

6. The method for the preparation of methallylbenzene and certain para-alkyl methallylbenzenes which comprises heating at pyrolysis temperatures in admixture with at least a stoichiometric amount of sodium benzoate a compound having the generic formula A—P—X, in which A is a substituent selected from the group consisting of hydrogen and alkyl radicals having from one to seven carbon atoms, P is the paraphenylene radical and X is the chloro-tertiary-butyl radical.

7. The method for the preparation of methallylbenzene and certain para-alkyl methallylbenzenes which comprises heating at pyrolysis temperatures in admixture with at least a stoichiometric amount of sodium propionate a compound having the generic formula A—P—X, in which A is a substituent selected from the group consisting of hydrogen and alkyl radicals having from one to seven carbon atoms, P is the paraphenylene radical and X is the chloro-tertiary-butyl radical.

8. The method for the preparation of methallylbenzene and certain para-alkyl methallylbenzenes which comprises heating at pyrolysis temperatures in admixture with at least a stoichiometric amount of sodium acetate a compound having the generic formula A—P—X, in which A is a substituent selected from the group consisting of hydrogen and alkyl radicals having from one to seven carbon atoms, P is the para-phenylene radical and X is the chloro-tertiary-butyl radical, the pyrolysis being effected with the reaction mixture containing a mixture of acetic acid and acetamide.

9. The method of claim 8 in which the heating is effected at a temperature within the range from about 175 to about 235° C.

10. The method for the preparation of methallylbenzene and certain para-alkyl methallylbenzenes which comprises heating at pyrolysis temperatures in admixture with at least a stoichiometric amount of sodium benzoate a compound having the generic formula A—P—X, in which A is a substituent selected from the group consisting of hydrogen and alkyl radicals having from one to seven carbon atoms, P is the paraphenylene radical and X is the chloro-tertiary-butyl radical, the pyrolysis being effected with the reaction mixture containing a mixture of benzoic acid and acetamide.

11. The method of claim 10 in which the heating is effected at a temperature within the range from about 175 to about 235° C.

12. The method for the preparation of methallylbenzene and certain para-alkyl methallylbenzenes which comprises heating at pyrolysis temperatures in admixture with at least a stoichiometric amount of sodium propionate a compound having the generic formula A—P—X, in which A is a substituent selected from the group consisting of hydrogen and alkyl radicals having from one to seven carbon atoms, P is the paraphenylene radical and X is the chloro-tertiary-butyl radical, the pyrolysis being effected with the reaction mixture containing a mixture of propionic acid and acetamide.

13. The method of claim 12 in which the heating is effected at a temperature within the range from about 175 to about 235° C.

DAVID DAVIDSON.
SAMUEL J. KAHN.

No references cited.

Certificate of Correction

Patent No. 2,454,779.   November 30, 1948.

DAVID DAVIDSON ET AL.

It is hereby certified that error appears in the printed specification of the above numbered patent requiring correction as follows:

Column 6, line 74, claim 4, after the word "which" insert *A*;

and that the said Letters Patent should be read with this correction therein that the same may conform to the record of the case in the Patent Office.

Signed and sealed this 22nd day of March, A. D. 1949.

[SEAL]

THOMAS F. MURPHY,
*Assistant Commissioner of Patents.*